United States Patent [19]

White et al.

[11] Patent Number: 4,493,651

[45] Date of Patent: Jan. 15, 1985

[54] STATISTICAL TEACHING APPARATUS

[75] Inventors: Allan E. White, Hightstown; David E. Coleman, Kendall Park; Steven R. Miller, Cranbury, all of N.J.

[73] Assignee: RCA Corporation, New York, N.Y.

[21] Appl. No.: 586,272

[22] Filed: Mar. 5, 1984

[51] Int. Cl.$^3$ .............................................. G09B 19/00
[52] U.S. Cl. ........................................ 434/188; 324/62
[58] Field of Search ................... 434/188, 353; 324/62

[56] References Cited

U.S. PATENT DOCUMENTS

| | | | |
|---|---|---|---|
| 2,838,851 | 6/1958 | Lusser | 434/188 |
| 3,095,655 | 7/1963 | Berglund et al. | 434/188 |
| 3,278,736 | 10/1966 | Pastoriza | 434/188 |
| 3,488,862 | 1/1970 | Eckhart, Jr. | 434/188 |
| 3,717,941 | 2/1973 | Tomerlin | 434/188 |
| 3,836,847 | 9/1974 | Lucas | 324/62 |
| 3,873,917 | 3/1975 | Kreuzer | 324/62 |
| 4,048,484 | 9/1977 | Brittan | 434/353 X |
| 4,217,702 | 8/1980 | Bennett | 434/188 |
| 4,408,157 | 10/1983 | Beaubien | 324/62 |

OTHER PUBLICATIONS

"Probability and Statistics: Experimental Results of a Radically Different Teaching Method," by Julian L. Simon et al., *The American Mathematical Monthly*, Nov. 1976, pp. 733-739.

*Primary Examiner*—William H. Grieb
*Attorney, Agent, or Firm*—Joseph S. Tripoli; George E. Haas; William Squire

[57] ABSTRACT

A statistical teaching apparatus includes a plurality of parallel circuits selectively coupled to an operational amplifier. Each circuit is adapted to receive a component from a population being statistically evaluated. The circuits include amplifier feedback elements arranged to selectively cause the amplifier to produce an output voltage representing the value of a parameter of any selected component or the average parameter value of any selected group of components so as to permit plotting of actual parameter values of a selected subgroup and measuring the average parameter value of that subgroup.

10 Claims, 1 Drawing Figure

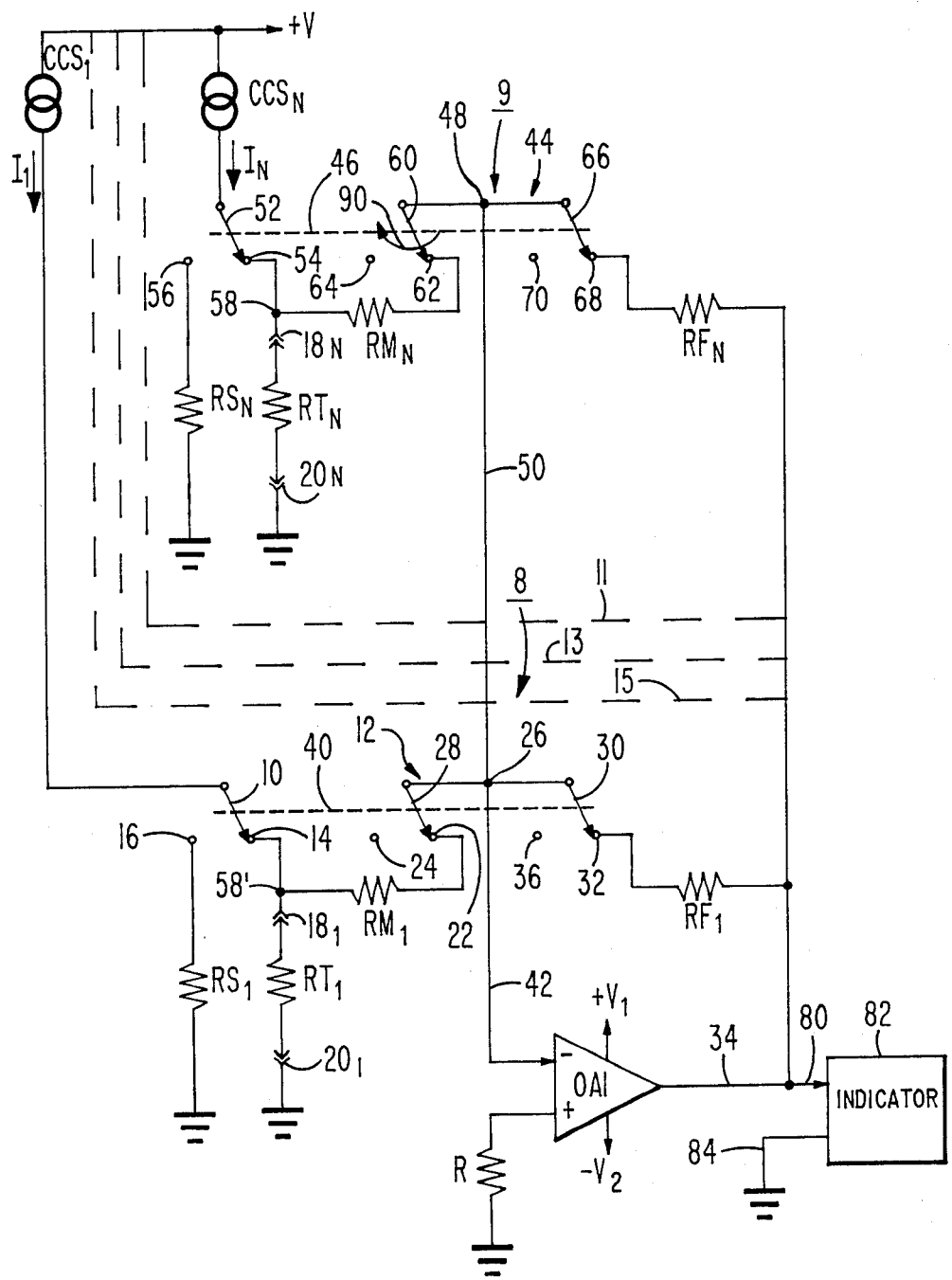

STATISTICAL TEACHING APPARATUS

This invention relates to an apparatus for teaching statistics and, in particular, to demonstrate the central-limit theorem.

The central-limit theorem is a well known statistical concept. For example, in U.S. Pat. No. 3,717,941 a probability teaching aid is disclosed which can demonstrate certain aspects of the central-limit theorem. In FIG. 7 thereof a distribution curve illustrates a Gaussian distribution based on the central-limit theorem. That theorem states that the averages of samples from a population are distributed normally (Gaussian distribution) regardless of the population distribution.

In that patent, a brush is rotated in contact with a certain number of discrete plate conductors in an angular extent of 360°. The plates each have a surface area proportional to the angular degrees of contact with the rotating brush according to known areas under a probability curve calculated for the number of divisions in the angular extent formed by the plates. Each contact plate is electrically connected through a resistor of a different value to a readout device so that different readout values are obtained for the various plates on which the brush comes to rest. However, the resulting statistics are limited to the inherent designed characteristics of the disclosed structure. That is, the brush is rotated and is expected to randomly stop over a given plate proportionately with the designed relative angular extent of that plate.

In practice, many different elements which may be produced in a manufacturing process have parameters or characteristics with many different underlying distributions. By taking averages and using the centeral-limit theorem, one can make almost any underlying distribution Gaussian, in the limiting sense. Because the Gaussian distribution is well known by averaging, one can determine when a manufacturing process is out of control.

The present inventors believe it is desirable that a statistical teaching apparatus should demonstrate the characteristics or parameters of actual manufactured articles or elements of the underlying population distribution. As a teaching aid such an apparatus should provide statistical information on an actual process and provide representative distributions of such process parameters or characteristics.

For example, resistors are available in different "tolerances." That tolerance is intended to represent the maximum percent deviation of the resistance from the specified nominal value. For example, a resistor of one percent tolerance supposedly has a resistance within one percent of the specified nominal value. A 1,000 ohm resistor having a one percent tolerance supposedly would have a resistance plus or minus one percent of 1,000 ohms, or plus or minus ten ohms. A five percent resistor then would be a resistance whose nominal value might be expected to be 1,000 ohms plus or minus five percent of 1,000 ohms. But that is not true.

Manufacturers in selecting resistances of different tolerances cull out the resistances of different values from the production population. Therefore, resistors whose value is given as a tolerance of five percent is a resistor drawn from a population in which the one percent resistors have already been culled. Therefore, these resistors are bimodal with the two modes near about plus or minus five percent, e.g., fifty ohms from the nominal 1,000 ohm value.

To the same extent ten percent resistors would exhibit similar bimodal characteristics. In this case, the one percent and five percent resistors are culled out, leaving the ten percent resistors varying in population near the two nominal plus and minus ten percent values. One nominal value is minus ten percent from the nominal 1,000 ohm value, or 900 ohms, and the other nominal value is plus ten percent or 1,100 ohms. The populations of a ten percent resistor, therefore, would not exhibit a Gaussian distribution about a nominal specified value, but two distributions centered about two values spaced from the nominal.

An apparatus according to the present invention is one which can teach statistical concepts relating to the central-limit theorem by examining a particular characteristic or parameter of a selected element or selected group of elements of a population distribution. The apparatus can provide both average and specific values of all members of the selected group so that the plots of specific curves can be made from the specific values and compared to the average value.

More particularly, a statistical teaching apparatus according to the present invention comprises means for sensing a given characteristic of each of a plurality of elements to be statistically evaluated. Means are included for selectively measuring the value of the sensed given characteristic of one or more selected elements of a selected group of the elements. Means are also included which selectively average the measured characteristics of the elements in the selected group. Means selectively couple the one or more means for sensing to the means for measuring and to the means for averaging to respectively measure the sensed characteristic of any selected element and to provide the average of the sensed characteristics of the selected group. Means indicate the measured value of the selected element sensed characteristic and the average of the sensed characteristic values of the selected group.

The sole drawing is a schematic circuit diagram of one embodiment of the present invention.

The circuit of the drawing figure illustrates the central-limit theorem employing resistors (as a sample from the underlying distribution) as the element under test. Resistors are used because they are relatively inexpensive, are easily obtainable, and have known distribution shape for selected tolerances. The resistors can be selected from a large population to give different statistical averages and may be employed in other ways to demonstrate statistical principles, e.g., design of experiments, control charts, and so forth. However, resistors are exemplary of other elements with other characteristics which can also be statistically evaluated by an apparatus constructed and operated according to the present invention, as will become clearer below.

In the described apparatus, the elements under test $RT_1$-$RT_N$, which are illustrated as resistors, may be drawn from a population of ten percent tolerance values. By way of example the resistors $RT_1$-$RT_N$ may have 1,000 ohm specified nominal values but may have other values depending on a given implementation.

Circuits 8 and 9 are two substantially identical parallel circuits which are exemplary of a larger number of identical parallel circuits represented by dashed lines 11, 13, and 15. By "substantially identical" is meant that the resistor components of the parallel circuits are selected from a given population of a given tolerance, but may vary within the expected tolerance range.

A voltage +V is applied in parallel to a plurality of constant current sources $CCS_1$–$CCS_N$ in respective circuits 8, 9. In circuit 8, $CCS_1$ is connected to wiper 10 of a double throw three pole switch 12. Contacts 14 and 16 of switch 12, which are selectively engaged by wiper 10, are selectively coupled to a source of reference potential, e.g., ground, through respective stabilizing resistance $RS_1$ and a resistor under test $RT_1$. Resistor $RT_1$ is releasably inserted in jacks $18_1$ and $20_1$. so that other resistors may be used at this location. Resistors $RT_1$ and $RS_1$ have approximately the same value. The resistor $RS_1$ is coupled to $CCS_1$ in a stand-by mode and serves to stabilize the current from source $CCS_1$. That is, $RS_1$ provides a load to $CCS_1$ so that when $CCS_1$ is switched from RS to RT, from stand-by to measure modes, the load remains approximately the same so that the $CCS_1$ current $I_1$ remains constant. The CCS's are always on, driving either the RS load (stand-by) or the RT load (measure). Wiper 10 is shown engaging contact 14 in the "measure" position. Resistance $RM_1$ is connected between switch 12, contact 14, and contact 22. Contact 24 is isolated.

Switch 12 includes wipers 28 and 30 both connected to node 26. Wiper 28 engages either contact 22 when in the "measure" position as shown or isolated contact 24 when in the "stand-by" position. Wiper 30 engages contact 32 when in the "measure" position and engages isolated contact 36 when in the "stand-by" position. Feedback resistance $RF_1$ is coupled between node 26 via contact 32 and the output 34 of operational amplifier OA1. The wipers 10, 28 and 30 are ganged as represented by the dashed line 40. As shown, the wipers when in the "measure" position couple $CCS_1$, resistance network $RT_1$ and $RM_1$ and the feedback resistance $RF_1$ to node 26. Node 26 is connected by wire 42 to the inverting input of OA1. The non-inverting input of OA1 is coupled through resistance R to the reference potential (such as ground).

Circuit 9 includes $CCS_N$, three pole double throw switch 44 and resistances $RM_N$, $RF_N$, and $RS_N$. Switch 44 is identical to switch 12 and its wipers 52, 60, 66 are identical to corresponding wipers 10, 28, and 30 of switch 12. The switch 44 wipers are ganged together as represented by dashed line 46. Node 48 of switch 44 is connected via wire 50 to the node 26 of switch 12 and thereby to the inverting input of the amplifier OA1. The resistance $RM_N$ is connected between contacts 54, 62 similar to the connection of resistance $RM_1$ to contacts 14, 22. The resistance $RF_N$ couples contact 68 to the amplifier output 34. The resistance $RT_N$ is connected between contact 54 and the reference potential via jacks $18_N$, $20_N$. Resistance $RS_N$ connects contact 56 to the same reference potential to which $RS_1$ is connected. Wiper 52 of switch 44, couples $CCS_N$ to either contact 54 or 56 to selectively couple $CCS_N$ to either point 58 between resistances $RM_N$ and $RT_N$ or to the system ground through resistance $RS_N$, respectively. The wiper 60 selectively couples node 48 to contact 62 at one end of resistance $RM_N$ or to isolated contact 64. Wiper 66 couples node 48 to contact 68 at one end of resistance $RF_N$ or to isolated contact 70. The elements $CCS_N$, $RM_N$, $RS_N$, and $RT_N$ when in circuit are in parallel to respective elements $CCS_1$, $RM_1$, $RS_1$, and $RT_1$. The resistors $RF_1$–$RF_N$ are in parallel when coupled in circuit.

The wipers of switch 44 are, by way of illustration, shown being in the same state as the wipers of switch 12. That is, switch 44 is shown coupling resistances $RT_N$, $RM_N$, $RF_N$ in circuit with $CCS_N$ and OA1. However, the individual switches 12–44 are operated independently. That is, switch 12 may be positioned such that its corresponding resistor under test $RT_1$ is in circuit while the remaining switches of the circuits represented by dashed lines 11, 13, and 15 and switch 44 are in the stand-by position so that their corresponding test resistors RT are out of circuit. Any combination of the switches 12–44 may be placed in circuit in the measure mode with the remaining switches out of circuit in the stand-by mode.

While the dashed lines 11, 13, and 15 represent three parallel circuits substantially identical to circuits 8 and 9, it should be understood that, in practice, many more parallel circuits may be included, for example, at least eight. Each such parallel circuit represents a test station for independently evaluating a sensed element parameter under test, e.g., the resistance of resistors $RT_1$–$RT_N$. The combined circuits also average the values of the sensed parameters for any selected group of those elements.

The amplifier output 34 is coupled as an input 80 to indicator 82 which is also coupled to system ground via wire 84. Indicator 82 displays the magnitude of the voltage produced by amplifier OA1 on output 34.

The subscript "N" for the circuit 9 elements is intended to mean that any number of parallel circuits may be instituted, and the five illustrated parallel circuits 8, 9, 11, 13, and 15 are by way of example only. Each parallel circuit includes a constant current source $CCS_{1-N}$, a switch 12–44, a stabilizing resistance $RS_{1-N}$, a feedback resistance $RF_{1-N}$, a resistance $RM_{1-N}$ and a set of jacks $18_{1-N}$–$20_{1-N}$ for receiving a resistor under test $RT_{1-N}$.

In operation, all switches 12–44 are placed in the stand-by out of circuit position direction 90 so that the stabilizing resistances $RS_1$–$RS_N$ in circuit with the respective corresponding constant current sources $CCS_1$–$CCS_N$. The remaining resistances RT, RM and RF are out of circuit.

The resistances RM and RF are substantially identical and, by way of example, may have the value of 10K ohms. These resistors set the gain of amplifier OA1 at unity in a well-known manner. The resistances RS and RT are substantially identical in nominal value, for example, 1K ohm. Resistances RS differ from the actual value of resistances RT in that resistances RS may be from a one percent tolerance population and resistances RT from a ten percent tolerance population.

As can be determined by observation, the potential appearing at point 58 between resistances $RT_N$ and $RM_N$, circuit 9, has a value that is proportional to the value of the resistance $RT_N$. Because resistance $RM_N$ equals resistance $RF_N$, within their expected tolerance range, in a given feedback loop to amplifier OA1, amplifier OA1 has substantially unity gain. A potential of inverse polarity, but having the same magnitude as the potential at point 58, appears at the OA1 output 34. That is, the output of amplifier OA1 is minus one volt per K ohm of test resistor resistance for the values of the resistances give herein.

The potentials at points corresponding to point 58 for each of the remaining parallel circuits 8, 11, 13, and 15 (e.g., point 58' in circuit 8) will result in corresponding potentials of inverted polarity at the output 34 of amplifier OA1. The potentials of inverted polarity are produced when those particular test resistors $RT_{1-N}$ are selectively placed in the circuit one at a time. The respective sensed resistance values of $RT_{1-N}$ will be indicated by indicator 82.

Assuming, however, for purposes of explanation, that resistances $RF_{1-N}$ are not in circuit when switches 12–44 are placed in circuit, then all of the potentials at corresponding points, such as points 58, 58', will be summed by amplifier OA1.

In this case, then:

$$(1)\ V_0 = -\left(\sum_1^N I \cdot RT\right) \cdot \left(\frac{RM}{RF}\right)$$

where I is the current from those CCS in circuit and $V_0$ is the amplifier OA1 output voltage. That is:

$V_0 =$ —sum of input voltages times the gain of input amplifier OA1 which is approximately unity (because $RM \approx RF$). (2)

Assuming the resistances $RF_{1-N}$ are switched in circuit as shown in the drawing figure, then the gain of amplifier OA1 varies 1/N, where N represents the number of parallel circuits, such as circuits 8, 9, and so forth, connected in circuit. If it is assumed currents $I_1-I_N$ are equal and the resistances RM are equal and equal to resistances RF, notwithstanding the slight differences in actual values due to their tolerance ranges, then the transfer function of amplifier OA1 can be generalized to:

$$(3)\ V_0 = (K)\left(\frac{\sum_1^N RT_i}{N}\right)$$

where K is a constant and N is the number of test resistors $RT_i$ connected in-circuit.

The above equation has the general form:

$$(4)\ \bar{x} = \frac{\sum_1^N x_i}{N}$$

which is the average. The switching arrangement permits the user to display the sensed resistance of any one of the N resistances as well as the average resistance of any selected combination of those resistances.

Assume for example resistances $RT_1-RT_N$ are inserted in corresponding jacks $18_1-18_N$ and $20_1-20_N$; and switches 12–44 are in the stand-by state. All constant current sources ($CCS_{1-N}$) are coupled to the corresponding stabilizing resistances $RS_{1-N}$. It is now desired to measure the value of a given resistance, e.g., $RT_1$. Only switch 12 is placed in the measure position shown in the figure. This provides a potential at point 58' between $RM_1$ and $RT_1$ and has a value representing the value of resistance $RT_1$. Output 34 of amplifier OA1 has a potential $V_0$ whose value is the negative of that potential and is displayed by indicator 82.

Suppose it is desired to display the value of all of resistors $RT_1-RT_N$, one at a time. Each of the switches 12–44 are selectively placed in circuit so that the indicator 82 will indicate the value of that selected resistance. After this is completed, all of the switches 12–44 are coupled in circuit concurrently, the input voltage to the inverting input of OA1 represents the average value of all of the resistances $RT_1-RT_N$ in circuit and will be indicated by indicator 82.

If it desired to indicate the average value of any subgroup of component elements under test, then those particular switches 12–44 are placed in circuit and the remaining switches out of circuit in the stand-by position. The average value for those selected components is then displayed by indicator 82. If the individual resistance value of the selected subgroup of resistors under test are to be ascertained, then the resistors of that subgroup are switched one by one in circuit and the remaining resistors are placed out of circuit in stand-by.

Using resistors having a ten percent tolerance value and exhibiting a bimodal distribution, an average reading on indicator 82 will be presented. That average reading, however, does not necessarily represent the nominal resistance value of the selected resistors. The individual values of the subpopulation placed in the apparatus can be individually read out from indicator 82 and plotted.

Thus this apparatus clearly teaches one not familiar with statistical techniques the average and specific values of any random sample from a population. While resistors of certain values have been illustrated by way of example, other components having other parameters and characteristics may also be employed. This system is readily adaptable to any characteristic measuring system and in which the characteristic under investigation can be presented as a given potential. Therefore, the use of constant current sources and resistances are by way of example as other implementing structures may produce potentials of interest employing other systems. Such other systems may employ sensors which produce voltages as outputs representing the values of a sensed parameter. For example, such sensors may be thermal, optical or any other physical phenomena sensor. The sensors in those cases would be identical as near as possible and coupled in parallel circuits as described. The parameter being sensed may be light intensity, heat, force, or any other measurable characteristic whose statistical distribution is being investigated for purposes of teaching. Thus, the present invention has application to a broad spectrum of natural or man-made elements to be statistically investigated.

What is claimed is:

1. A statistical teaching apparatus for statistically evaluating a plurality of elements comprising:
means for selectively measuring a given characteristic of one or more selected elements of a selected group of said elements;
means for selectively averaging said measured characteristics of said elements in said selected group;
means for selectively coupling said one or more elements to said means for measuring and to said means for averaging to respectively measure the characteristic of any selected element and to provide the average of the characteristics of said selected group; and
means for indicating the measured value of said selected element characteristic and the average of said characteristic values of said selected group.

2. The apparatus of claim 1 further including means for releasably receiving a plurality of said elements, wherein:
said means for receiving includes means for receiving an electrical component;

said means for measuring includes a plurality of like signal generating means, each for connection to a separate, different component; and said means for selectively coupling said one or more received elements including means for applying the signals produced by said generating means to corresponding ones of said components to produce a component signal representing the value of said given characteristic, said component signal being coupled to said selective measuring means for providing said measurement.

3. The apparatus of claim 2 wherein said means for averaging includes means responsive to the concurrent generation of a plurality of said component signals for averaging said measured characteristics.

4. A teaching apparatus comprising:
means for releasably receiving a plurality of electrical components;
means for applying a first signal of substantially the same value to each said means for receiving; said received components each being responsive to said applied first signal for creating a second signal having a value representing a component parameter under test;
averaging means responsive to said second signal applied thereto for providing an output signal having a value representing the second signal value of a selected component and the average value of said second signal values for a plurality of selected components;
switch means for coupling selected ones of said means for applying said first signal to corresponding component receiving means, and for coupling corresponding component receiving means to said averaging means; and
indicator means responsive to said output signal for indicating said second signal value of said selected component and said average value.

5. The apparatus of claim 4 wherein:
said means for receiving components includes means for receiving a plurality of resistors under test;
said means for applying a first signal includes means for applying a constant current to each said selected component receiving means for creating a potential difference across a corresponding received resistor having a value related to the resistance of that received resistor; and
said averaging means including amplifier means responsive to said potential difference applied as an input thereto and having feedback means for providing unity gain to produce an output signal whose value represents the value of said potential difference.

6. The apparatus of claim 5 wherein:
said amplifier includes inverting and non-inverting inputs;
said feedback means includes a plurality of resistances of like value, said switch means serially coupling selected pairs of said plurality of resistances between (1) the amplifier output, and (2) said means for applying a first signal and one terminal of said resistor under test; and
said switch means further coupling a point between said selected serially coupled pairs to said inverting input; and coupling a second terminal of said resistor under test and said non-inverting input to a reference potential.

7. A teaching apparatus comprising:
a plurality of sockets, each for releasably receiving a corresponding electrical component, each component having a given parameter of a certain value;
signal generating means for generating a plurality of like signals, each said received component being responsive to a corresponding one of said like signals for producing a component signal exhibiting said certain value;
parameter averaging means responsive to said component signal for producing an output signal having a value representing the average of said certain values of a selected group of said component signals applied thereto, said averaging means including means such that said output signal has a value representing the value of that certain value of any one selected component signal of said selected group applied thereto;
switch means for selectively coupling any of said plurality of socket means corresponding to said selected group to said corresponding like signal generating means and to said averaging means; and
indicator means responsive to said output signal for indicating said average and selected component parameter values.

8. The apparatus of claim 7 wherein said signal generating means includes a plurality of constant current sources; said parameter averaging means including amplifier means and a plurality of feedback means adapted for connection in parallel between an amplifier means output and an input, said switch means selectively coupling a selected one or more of said socket means between a source of reference potential and a corresponding point between a selected feedback means and a selected constant current source.

9. The apparatus of claim 8 further including stabilizer means for stabilizing the currents from said constant current sources, said switch means including means for selectively decoupling said selected constant current sources from said stabilizing means upon selective coupling of said socket means to said selected constant current source.

10. A statistical teaching apparatus comprising:
means for sensing a given characteristic of each of a plurality of elements to be statistically evaluated;
means for selectively measuring the value of the sensed given characteristic of one or more selected elements of a selected group of said elements;
means for selectively averaging said measured characteristics of said elements in said selected group;
means for selectively coupling said one or more means for sensing to said means for measuring and to said means for averaging to respectively measure the sensed characteristic of any selected element and provide the average of said sensed characteristics of said selected group; and
means for indicating the measured value of said selected element sensed characteristic and the average of said sensed characteristic values of said selected group.

* * * * *